(12) United States Patent
Simmons

(10) Patent No.: US 8,173,207 B2
(45) Date of Patent: May 8, 2012

(54) ARRANGEMENT FOR DEPOSITING COATING POWDER ON A ROTATIONAL SYMMETRIC BODY

(75) Inventor: Ulf Simmons, Norrkoping (SE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/967,111

(22) Filed: Dec. 14, 2010

(65) Prior Publication Data

US 2011/0143027 A1    Jun. 16, 2011

(30) Foreign Application Priority Data

Dec. 15, 2009  (EP) ..................................... 09015539

(51) Int. Cl.
  *B05D 1/12* (2006.01)
  *B05C 19/04* (2006.01)
(52) U.S. Cl. ......... 427/180; 427/201; 118/308; 198/540
(58) Field of Classification Search .................. 427/180, 427/201; 118/308; 198/540
  See application file for complete search history.

(56) References Cited

U.S. PATENT DOCUMENTS

| | | | | | |
|---|---|---|---|---|---|
| 3,245,341 | A | * | 4/1966 | Childress et al. | 101/122 |
| 3,411,933 | A | * | 11/1968 | Moore | 427/184 |
| 4,552,091 | A | * | 11/1985 | Feder | 118/620 |
| 5,245,155 | A |   | 9/1993 | Aleshin | |
| 5,639,070 | A |   | 6/1997 | Deckard | |

FOREIGN PATENT DOCUMENTS

| | | | |
|---|---|---|---|
| DE | 10 2007 060 964 A1 | | 6/2009 |
| GB | 2 454 779 | * | 5/2009 |
| GB | 2 454 779 A | | 5/2009 |

* cited by examiner

*Primary Examiner* — Frederick Parker

(57) ABSTRACT

An arrangement for depositing coating powder on a rotational symmetric body is provided. The arrangement includes a rotation device for rotating the rotational symmetric body around a horizontal axis of rotation, wherein the horizontal axis of rotation coincides with the axis of the rotational symmetry of the body, a nozzle arranged vertically above a surface of the rotational symmetric body for providing the coating powder to the surface and a horizontal barrier at a specified distance defining a coating thickness above the surface, wherein the barrier is arranged next to the nozzle in the direction of a rotational movement of the surface at the nozzle. At this point, the nozzle includes a cross section elongated in one direction parallel to the axis of rotation.

16 Claims, 2 Drawing Sheets

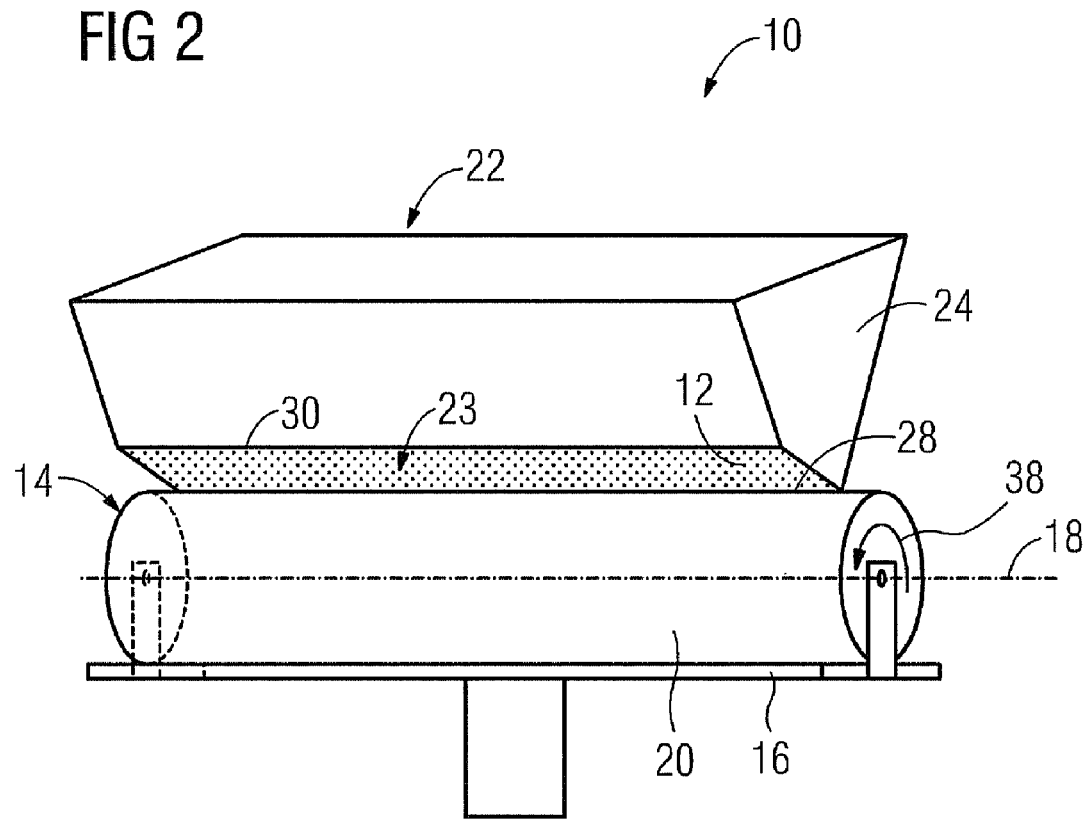

ARRANGEMENT FOR DEPOSITING COATING POWDER ON A ROTATIONAL SYMMETRIC BODY

CROSS REFERENCE TO RELATED APPLICATIONS

This application claims priority of European Patent Office application No. 09015539.1 EP filed Dec. 15, 2009, which is incorporated by reference herein in its entirety.

FIELD OF INVENTION

The present invention relates to an arrangement for depositing a coating powder on the surface of a rotational symmetric body.

BACKGROUND OF INVENTION

It is often necessary to plate or clad the interior or exterior surfaces of metal components to improve the wearability of such components or to improve the corrosion resistant properties thereof. Commonly a welding apparatus is used to provide the plating or cladding by depositing a weld material such as a welding powder on the surface of the work piece and then machining the welded area to the proper shape to provide a smooth surface.

U.S. Pat. No. 5,245,155 B2 discloses an apparatus for welding together a plurality of portions of a work piece. The apparatus comprises a powder feed means having a nozzle for depositing a chosen volume of welding powder onto the work piece surface during a welding operation and a laser source for generating a laser beam positioned at a certain distance from the work piece to form a weld bead of a selected width. Disadvantageously, the nozzle has a low yield in terms of supplied powder and the deposit rate on the work piece is limited.

SUMMARY OF INVENTION

It is an object of the invention to apply an accurate amount of coating to a rotational symmetric body with a high deposit rate of the coating powder.

This object is fulfilled by an arrangement according to the claims and a method according to the claims.

By arranging the nozzle for providing the coating powder vertically above the surface and rotating the rotational symmetric body underneath the nozzle the symmetry of the body is used to provide a high deposit rate of the coating powder, wherein the horizontal barrier at a specified distance from the surface ensures that an accurate amount of coating is deposited to the surface. The barrier, which is arranged next to the nozzle in the direction of a rotational movement of the surface at the nozzle, swipes off any excess coating powder depending on the specified distance between the barrier and the surface of the rotational symmetric body.

A nozzle with a cross section which is elongated in one direction parallel to the axis of rotation enables a particularly high deposit rate along the entire length of the elongated cross section. Additionally a means for adjusting the width of the elongated cross section of the nozzle to surfaces of different lengths can be provided.

According to another preferred embodiment the nozzle is arranged such that the direction of elongation is parallel to the axis of rotation. This helps to precisely position the powder stream onto the surface to account for welding.

According to another preferred embodiment the length of the cross section of the nozzle in the direction of its elongation is equal to the length of the surface in the direction of the rotational axis to increase the deposit rate of coating powder and reduce the number of revolutions to achieve the required thickness of coating.

According to an embodiment herein the arrangement further includes a coating powder feeding apparatus for providing the coating powder through the nozzle. This helps to precisely direct a defined stream of powder material of a predetermined quantity to the surface for more effective coating results.

According to an embodiment the nozzle has a first edge, which is located at the side of the nozzle in a direction opposite to the direction of the rotational movement of the surface at the nozzle and which is in contact with the surface. The first edge directs the coating powder towards the direction of the rotational movement of the surface at the nozzle. If the barrier has a fixed arrangement with respect nozzle, the first edge helps in keeping an exact distance between the barrier and the surface.

According to a preferred embodiment herein the barrier is formed by a second edge of the nozzle in the direction of the rotational movement of the surface. This is a very simple and inexpensive way to provide the barrier.

According to another preferred embodiment the arrangement includes a holding means to hold the barrier at a specified distance from the surface. This allows to securely define the distance and thereby the amount of coating powder provided to the surface.

According to another preferred embodiment the holding means is adapted to adjust the distance between the barrier and the surface. This provides the possibility to adapt the amount of powder provided to the surface and hence the thickness of the coating to different needs.

According to a preferred embodiment the arrangement further comprises a welding energy source to provide welding energy to the coating powder on the surface. This welding energy provides the sufficient heat to melt the powder to form a cladding layer on the surface.

According to another preferred embodiment the welding energy source is arranged next to the barrier in the direction of a rotational movement of the surface at the barrier. This enables effective welding of the powder on to the surface simultaneously when the powder is deposited through the nozzle, thereby preventing falling off from the surface due to the rotation.

According to yet another preferred embodiment the welding energy source is a laser beam. The laser beam has highly concentrated energy to provide an effective welding.

BRIEF DESCRIPTION OF THE DRAWINGS

The present invention is further described hereinafter with reference to illustrated embodiments shown in the accompanying drawings, in which:

FIG. 2 illustrates a schematic front view of the arrangement according to an embodiment herein.

Figure 1:
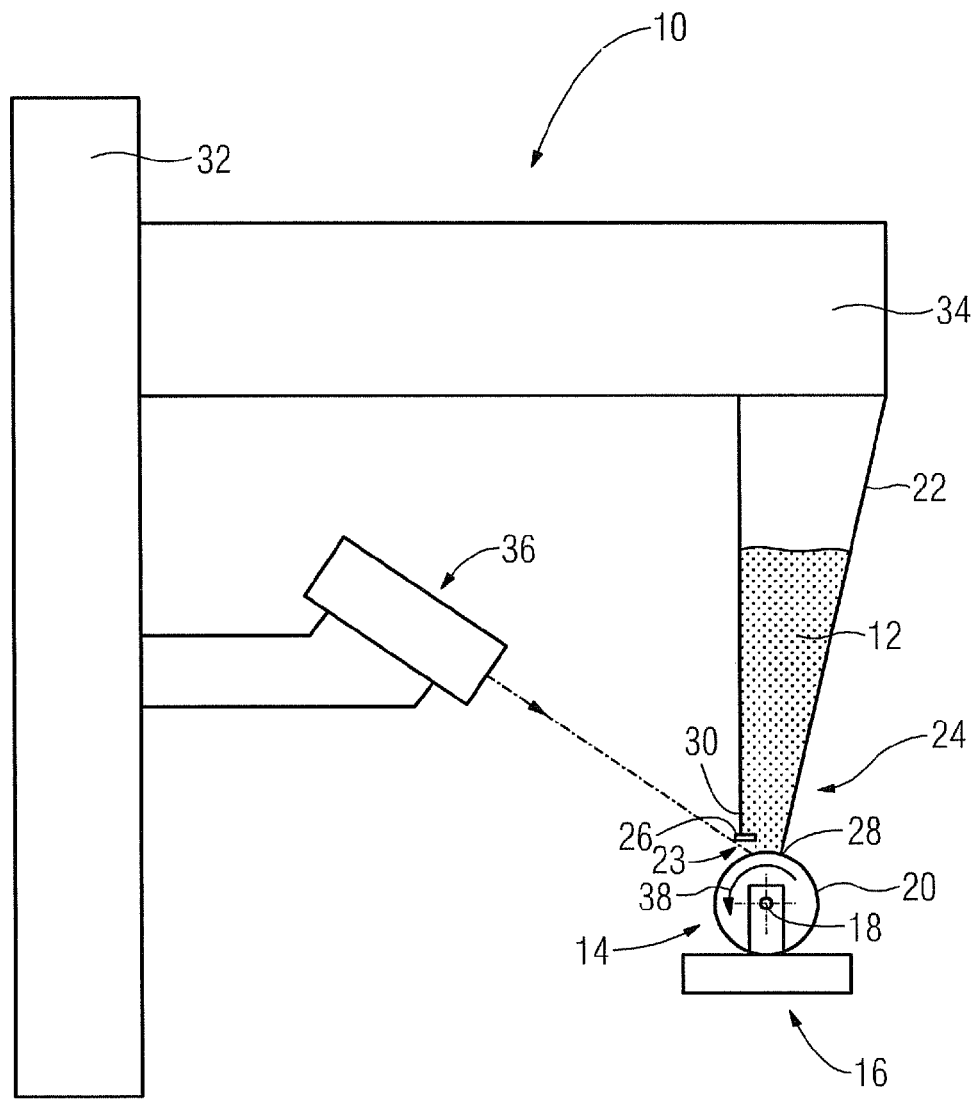
FIG. 1 illustrates a schematic overview in a cross-section of an arrangement for depositing coating powder on a rotational symmetric body according to an embodiment herein.

Various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

DETAILED DESCRIPTION OF INVENTION

FIG. 1 shows an arrangement 10 for depositing a coating powder 12 on a rotational symmetric body 14. The arrangement 10 comprises a rotation device 16 for holding the rotational symmetric body 14 and a coating powder feeding apparatus 22 for providing the coating powder 12 to the surface 20 of the rotational symmetric body 14. The rotational symmetric body 14 can be a shaft of a gas or steam turbine, for example.

The rotational symmetric body 14 is arranged in a rotating device 16, which allows rotating the rotational symmetric body 14 around a horizontal axis of rotation 18 which coincides with the axis of symmetry of the rotational symmetric body 14. There are many different forms in which the rotating device can be provided. For example, the rotational symmetric body 14 can be positioned between a chuck and a tailstock of a lathe. Another example is a rotary table with a chuck, wherein the rotary table is oriented in a vertical direction so that it resembles the chuck of the lathe. Alternatively a bed with two rotating rollers could be used on which the shaft is placed and rotated. A person skilled in the art will know many other possible embodiments for the rotating device 16 for rotating the rotational symmetric body 14 around a horizontal axis. The coating powder feeding apparatus 22 operates on the rotational symmetric body 14 for instance a rotor to apply a cladding layer for enhancement of surface properties. The coating powder feeding apparatus 22 a nozzle 24 at the bottom to provide a precise flow rate of coating powder 12 for laser welding as well as other welding operations where such precise flow of fine powder 12 is required.

The coating powder feeding apparatus 22 herein is arranged on top of the surface 20 of the rotational symmetric body 14 such that the nozzle 24 is arranged vertically above the surface 20 of the rotational symmetric body 14 for providing the coating powder 12 to the surface 20. The nozzle 24 has a cross section elongated in one direction parallel to the axis of rotation 18. The length of the cross section of the nozzle 24 in the direction of elongation is equal to the length of the surface 20 in the direction of the axis of rotation 18 to apply one layer of coating to the entire surface 20 in one rotation of the rotational symmetric body 14. Many layers of coating can easily be provided by repeating the coating process several times.

The arrangement 10 also includes a mounting means 34 to arrange the nozzle 24 parallel to the axis of rotation 18 of the surface 20.

The nozzle 24 herein is positioned on top of the rotational symmetric body 14 in such a way that the first edge 28 of the nozzle 24 which is located at the side of the nozzle in a direction opposite to the direction of the rotational movement of the surface 20 at the nozzle 24, is in contact with the surface 20. The second edge 30 of the nozzle 24 is placed at a specified distance from the surface 20.

The arrangement 10 further includes a horizontal barrier 26 arranged next to the nozzle 24 in the direction indicated by the arrow 38 of a rotational movement of the surface 20 at the nozzle 24. The barrier 26 is formed by the second edge 30 of the nozzle 24 opposite of the first edge 28. The barrier 26 is arranged at a specified distance defining a coating thickness above the surface 20 of the body 14. The gap between the barrier 26 and the surface 20 defines the thickness of the coating to be laid on the surface 20.

Since the first edge 28 is in direct contact with surface 20, the barrier 26 at the second edge 30 is kept at a specified distance to the surface. This allows to accurately define the distance and thereby the thickness of the coating of each layer. Additionally the barrier 26 can be mounted at the nozzle 24 such that the distance can be varied according to the required thickness of each coating layer or depending on the kind of coating powder.

The arrangement 10 further includes a holding means 32 to hold the nozzle 24 vertically above the surface 20 of the rotationally symmetric body 14. Additionally the holding means 32 can also specify the distance between the barrier 26 at the nozzle 24 and the surface 20 for embodiments in which the first edge 28 is not in direct contact with the surface 20.

The arrangement 10 further includes a welding energy source 36 to provide welding energy to the coating powder 12 on the surface 20. The welding energy source 36 is arranged next to the barrier 26 in the direction of a rotational movement of the surface 20 at the barrier 26. The welding energy source 36 is preferably a laser beam.

In FIG. 1 both the nozzle 24 and the welding energy source 36 are mounted to the same arrangement of holding means 32 and mounting mechanism 34. However, the nozzle 24 and the energy source 36 can be mounted to a different structure instead.

The powder 12 flows through the opening 23 of the nozzle 24 and gets deposited on the surface 20 of the body 14. The welding energy source 36 is then directed onto the surface 20 of the rotational symmetric body 14. The focusing of the welding energy source 36 is set in such a way that a specific beam size can be obtained on the surface 20 approximately corresponding to the area of the powder deposited. The powder 12 particles come to melt thereby forming a layer on the surface 20.

The nozzle 24 may be used with various type of coating powders 12 such as carbide powder and others which are known in the art. Here, the length of the nozzle 24 can be equal to the length of the surface 20 or can be lesser than the length of the surface 20.

For deposition welding after each layer is formed, the nozzle 24 and the welding energy source 36 are indexed or raised to adjust the elevation of the nozzle 24 relative to the surface 20 of the body 14 elevated by the deposited layer.

The barrier 26 herein may also be formed on the nozzle tip to shield the nozzle 24 from the reflected welding energy source and thereby preventing the welding energy source from melting the powder 12 being discharged from the nozzle 24 and thereby clogging at the nozzle 24.

FIG. 2 shows a schematic view of the arrangement 10 according to an embodiment herein. The coating powder feeding apparatus 22 is placed on top of the rotating body 14 such that the nozzle 24 for deposition of the powder 12 is parallel to the axis of rotation 18. As shown in FIG. 2, the first edge 28 of the nozzle is in contact with the surface 20 of the body 14 wherein the second edge 30 is placed at a certain distance from the surface 20.

The apparatus 22 is held in place on top of the rotating body 14 by the holding means 32 and with a system of springs. The geometry of the body 14 is such that the laser beam and powder 12 converge substantially within a localized region of the surface 20.

The arrangement 10 is used for coating the rotational symmetric body 14 by rotating it around its axis of symmetry, proving the coating powder 12 to the surface 20 and welding it to create a layer of coating. For the welding operation the energy source 36, such as a welding laser, is directed to the surface next to the nozzle 12. Laser melting of the coating powder 12 which is deposited to the surface 20 is, for example, performed layer by layer. Each layer can be as thin as a few tenth of Millimeter.

There are many possible ways to weld the coating powder 12 to the base material of the surface 20. One example is a stepwise process in which the coating powder 12 is welded line by line. At first, one line of coating powder 12 is provided to the surface 20 through the opening 23 of the nozzle 24, then the laser beam is moved over this line of coating powder 12 in the direction parallel to the axis of rotation 18 and finally the rotational symmetric body 14 is slightly rotated so that another line of coating powder 12 can be provided next to the previous line. This process is iteratively repeated for one or several full rotations to provide the required thickness of coating.

The thickness of leach layer of coating and the number of layers depends, for example, on the strength and density of the laser beam and the kind of coating powder 12. If too much coating powder 12 is provided, which is not welded to the surface 20 in this process, it will fall of the surface 20 during the rotation of the rotational symmetric body 14. The amount of coating powder 12 provided to the surface 20 is chosen such that no coating powder 12 falls of during the rotation of the body 14. However, to increase the speed of the coating process the rate of providing coating powder 12 should be increased as much as possible as long as all the coating powder 12 can be melted before the coating powder 12 falls of the surface 20 due to the rotation. This will depend on the melting capacity of the welding energy source 36, the kind of coating powder 12 and may additional depend on the required coating quality. A person skilled in the art will easily find the possible range of parameters for this optimization process without undue experimenting.

Instead of a continuously even coating of the surface 20 it might be required to provide a coating with a certain surface geometry. Examples are an outside thread built layer by layer on a cylindrical shaft or creating grooves, keyways and holey. Either the coating powder 12 which is not melted locally on these parts of the surface will fall of the surface 20, or the process of providing coating powder 12 is briefly stopped at positions of the surface, where no coating is required. In case of a surface structure which is smaller than the size of the opening 23 of the nozzle 24, it is preferred to continuously provide the coating powder 12 and to avoid local melting at parts of the surface, which are intended not to be coated. In this case it is possible to create a very fine structure on the surface coating which is only limited by the extent to which the welding energy can be focused.

The welding energy source 36 is arranged with respect to the nozzle 24 such that the welding energy, e.g. in form of a laser beam, is directed at a location on the surface 20 next to the opening 23, so that the welding energy can be applied directly after the coating powder 12 is deposited onto the surface 20. The welding energy can be applied in a direction orthogonally to the surface 20 or—as shown in FIG. 1—at a different angle. If the welding energy source is a laser device which generates a laser focused into one point, the laser beam can, for example, be arranged such that it can slide in a direction parallel to the axis of rotation 18. Alternatively the laser beam could be arranged such that it pivots around an axis which is orthogonal to the axis of rotation 18 to apply the laser beam onto a line of coating powder 12.

The rotational symmetric body 14 shown in FIGS. 1 and 2 has a cylindrical shape. However, it can also have any other rotational symmetric shape. If the shape is different from a cylinder, it is useful to use a nozzle 24 which is adapted to this shape, e.g. which has an opening 23 which is shaped according to the profile of the cross section of the rotational symmetric body in a plane through the axis of rotation 18. Alternatively a pointed nozzle 24 with a small opening 23 can be used which is moved along the contour of the surface 20 parallel to the axis of rotation 18 at varied distances to the axis of rotation 18 depending on the profile.

The body 14 need not be fully rotational symmetric. It would be sufficient if only a section along the axis of rotation 18 is rotational symmetric. Also, it would be sufficient if the body is only rotational symmetric along a fraction of the bodies circumference around the axis of rotation 18. In these two cases the parts of the surface 20 which are rotational symmetric can easily be coated with in the same way as described.

It is even possible to provide coating to parts of the surface 20 of the body 14 which are rotational symmetric by adjusting the distance of the nozzle 24 to the axis of rotation 18 when the body 14 is rotated around the axis 18. In this case the first edge 28, which is in permanent contact with the surface 20, ensures that the opening 23 of the nozzle 24 always remains at the same distance to the surface 20 of the body. Especially parts of the surface with slight deviations from a rotational symmetry with respect to the axis of rotation 18 can easily be coated in this way. The angle enclosed by the projection of the normal at a point of the surface 20 onto the plane orthogonal to the axis of rotation 18 through the same point on the one hand side and by a radial line from axis of rotation 18 to said point on the surface 20 on the other hand side can be 15°, 30° or even 45° to be considered a slight deviation in this sense.

In this embodiment of the invention the axis of rotation 18 can run arbitrarily through the body 14. However, preferably the axis of rotation is close to the center of the body 14 and should be roughly aligned to the elongated direction of the body 14 to minimize the adjustments of the distance between the nozzle 24 and the surface 20 necessary.

Camshafts and crankshafts are examples of non-rotational symmetric bodies 14 in the field of turbine design.

The invention claimed is:

1. An arrangement for depositing coating powder on a rotational symmetric body, the arrangement, comprising:
    a rotation device for rotating the rotational symmetric body around a horizontal axis of rotation, wherein the horizontal axis of rotation coincides with an axis of the rotational symmetry of the body;
    a nozzle arranged vertically above a surface of the rotational symmetric body for providing the coating powder to the surface; and
    a horizontal barrier at a specified distance defining a coating thickness above the surface, wherein the barrier is arranged next to the nozzle in a first direction of a rotational movement of the surface at the nozzle;
    wherein a first edge of the nozzle, which is located at a side of the nozzle in a direction opposite to the first direction of the rotational movement of the surface at the nozzle, is in contact with the surface.

2. The arrangement according to claim 1, wherein the nozzle includes a cross section elongated in one direction parallel to the horizontal axis of rotation.

3. The arrangement according to claim 2, wherein a first length of the cross section of the nozzle in a second direction of elongation is equal to a second length of the surface in a third direction of the horizontal axis of rotation.

4. The arrangement according to claim 3, wherein the nozzle is arranged such that the second direction of elongation is parallel to the horizontal axis of rotation.

5. The arrangement according claim 1, wherein the arrangement includes a coating powder feeding apparatus for providing the coating powder through the nozzle.

6. The arrangement according to claim 1, wherein the barrier is formed by a second edge of the nozzle opposite of the first edge.

7. The arrangement according to claim 1, wherein the arrangement includes a holding means to hold the barrier at the specified distance from the surface.

8. The arrangement according to claim 7, wherein the holding means is adapted to adjust the specified distance between the barrier and the surface.

9. The arrangement according to claim 1, further comprising a welding energy source to provide welding energy to the coating powder on the surface.

10. The arrangement according to claim 9, wherein the welding energy source is arranged next to the barrier in the first direction of a rotational movement of the surface at the barrier.

11. The arrangement according to claim 9, wherein the welding energy source is a laser beam.

12. The arrangement according to claim 1, wherein a mounting means is used to arrange the nozzle parallel to the horizontal axis of rotation of the surface.

13. The arrangement according to claim 1, wherein the barrier is formed on a tip of the nozzle.

14. A method for using an arrangement for depositing coating powder on a rotational symmetric body, the method comprising:
   rotating the rotational symmetric body around a horizontal axis of rotation using a rotation device such that the horizontal axis of rotation coincides with an axis of the rotational symmetry of the body;
   providing the coating powder to a surface of the rotational symmetric body through a nozzle arranged vertically above the surface; and
   defining a coating thickness of the powder on the surface of the rotational symmetric body by adjusting a distance between the surface and a horizontal barrier arranged next to the nozzle in a direction of a rotational movement of the surface at the nozzle in order to swipe off any powder in excess of the coating thickness.

15. The method according to claim 14, further comprising providing a welding energy to the coating powder on the surface from a welding energy source.

16. The method according to claim 14, wherein the arrangement comprises:
   a rotation device for rotating the rotational symmetric body around a horizontal axis of rotation, wherein the horizontal axis of rotation coincides with an axis of the rotational symmetry of the body.

* * * * *